Sept. 29, 1931.  E. R. CARR  1,825,504
POULTRY COOP GATE LATCH
Filed Nov. 1, 1930
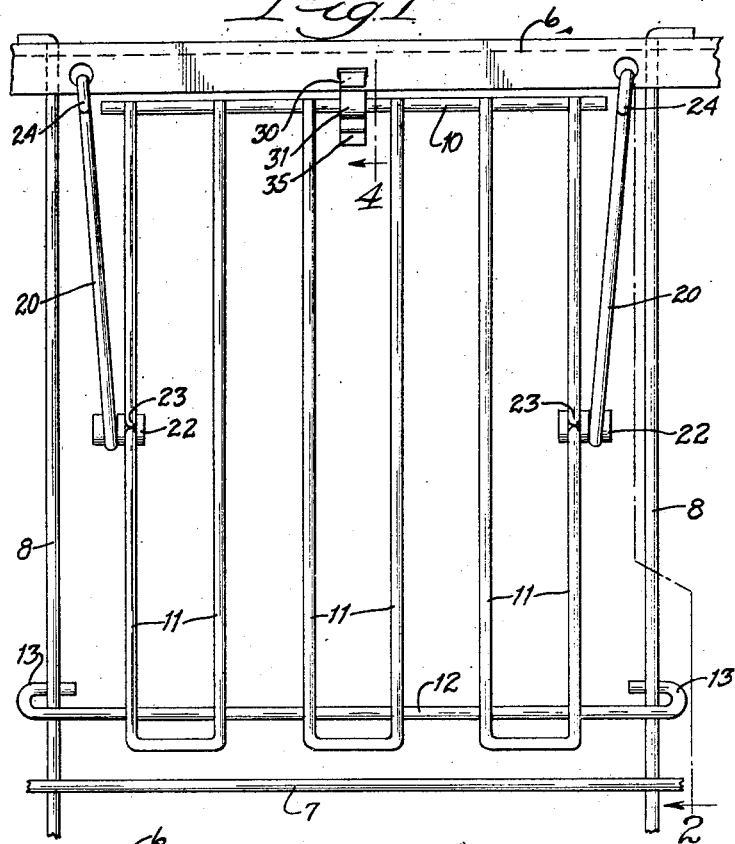
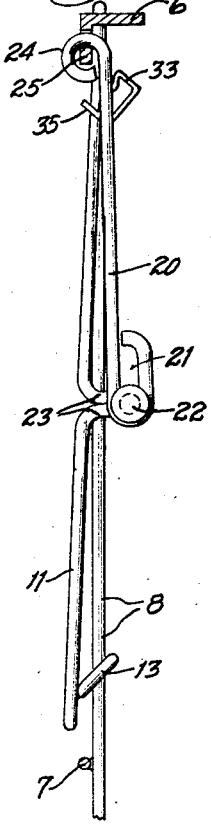
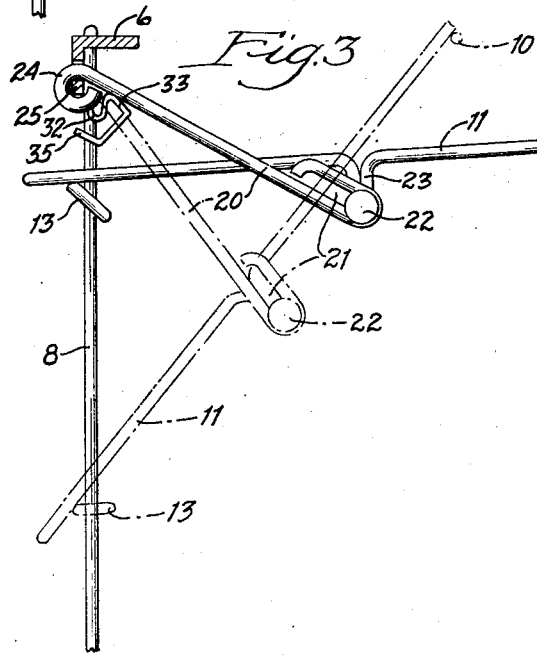
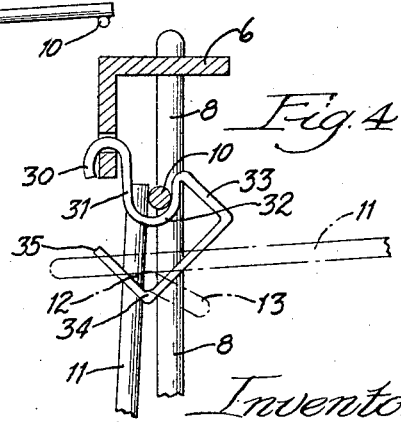
Inventor:
Ernest R. Carr,
By Banning & Banning
Attys.

Patented Sept. 29, 1931

1,825,504

UNITED STATES PATENT OFFICE

ERNEST R. CARR, OF CLINTON, IOWA, ASSIGNOR TO THE COLLIS COMPANY, OF CLINTON, IOWA, A CORPORATION OF IOWA

POULTRY COOP GATE LATCH

Application filed November 1, 1930. Serial No. 492,700.

This invention which relates generally to a gate adapted for coops such as are used for the confinement of poultry is concerned with a self-acting latch by which the gate is held in either open or closed position. For reasons of sanitation, ventilation, etc., it is customary to construct such coops of spaced wires carried on a frame with openings over which are fitted gates also of wire construction. The present improvements have to do with a self-acting latch applicable to such a gate which is manipulatable so as to remain in either open or closed position.

A suggestive embodiment of my invention is set forth in the accompanying drawings, wherein—

Figure 1 is a view in elevation of a gate fitted within a coop opening having the present latch equipment;

Fig. 2 is a view in section on line 2 of Fig. 1;

Fig. 3 which is a view similar to Fig. 2 shows the gate sustained by the latch in open position; and Fig. 4 is an enlarged detail in section on line 4 of Fig. 1 showing the latch in elevation.

So much of a coop as I have illustrated includes upper and lower frame bars or wires 6 and 7 supporting between them vertical guide wires 8 providing a frame which defines a rectangular opening adapted to be closed by a gate furnished with a horizontal top wire 10 providing support for a plurality of vertical wires 11 properly spaced with respect to each other and to the coop guide wires to afford a desired degree of confinement to poultry or other animals which are kept within the coop. Adjacent the lower end of the gate and joined to the vertical wires thereof is a horizontal cross wire 12 with its two ends looped around at 13 to encircle the guide wires 8. The gate is additionally suspended by a pair of link arms 20, one at each side thereof. The lower end of each arm is turned upon itself to provide a loop 21 elongated in the direction of the arm length. Through each of these loops is extended a pin 22 having double grooves in one of which is fitted the looped end of the arm. In the other of these grooves is received an eye 23 formed by a rearward distention of an outside vertical wire 11 of the gate. Each of the arms at its upper end is formed with an eye 24 for pivotal connection as at 25 with a frame bar 6.

With a gate of the character noted, I may associate a self-acting latch such as appears best in Fig. 4. Here is shown a latch wire, flat or round, having one end formed into a hook 30 which is inserted through an opening in the upper frame bar 6 to afford a swinging suspension therefor; the wire proceeds through a depending section 31, then executes a reverse bend to provide an upper seat in the form of a loop 32 having a rearwardly facing entrance; from this point the wire continues first obliquely through an inclined section 33 and then downwardly, following which it is then angled as at 34 to provide an inclined section 35 that defines a second and lower seat the entrance to which faces forwardly. The latch so formed is adapted to receive in its upper seat, the top wire 10 of the gate when the latter is in closed position, and in its lower seat the bottom cross wire 12 when the gate is fully opened.

The gate which tends, by gravity, to swing and drop to a down and closed position, is normally held against movement when its top wire is received within the upper seat of the latch. In reaching this position, the looped ends of the lower cross wire of the gate are free to slide upon the guide wires of the coop. The upper end of the gate moves through a path that is mainly horizontal, and upon striking the inclined section 33 of the latch rides up thereon preliminary to dropping into the upper seat 32. This slight raising of the gate near the completion of its closing movement, and also at the beginning of its opening movement, is not interfered with by the link arms due to their slip connections with the pins 22. When the gate reaches its fully open position, the bottom cross wire 12 which moves through a vertical path, strikes the inclined latch section 35, causing the latch to swing rearwardly a sufficient distance to let the cross wire pass, following which the latch swings back again to catch and sustain the wire, and the gate of which it is a part.

The advantages of the present latch are that it is simple in the extreme, being formed of a single piece of material having suitable size and strength. Its swinging mounting in the coop frame is effected by the simple expedient of a hook formation at one of its ends. To cooperate with horizontal gate wires, one moving through a horizontal and the other through a vertical path, it is provided with two seats having oppositely facing entrances each with an inclined way of its own. And the bends produced in the latch are such as to distribute its weight with respect to its point of suspension in a manner so as to position the inclined sections of the latch operatively with respect to the two cross wires of the gate.

I claim:

1. In combination, a frame in which is movably mounted a gate, and a latch swingingly depended from the frame in a position to engage with either of two spaced parts of the gate, the latch comprising a wire bent to provide two loops, one upper and rearwardly facing and the other lower and forwardly facing, the wire adjacent each loop being inclined with respect to the direction of movement of the gate part engageable therewith to be deflected preliminary to a locking operation.

2. In combination, a frame in which is movably mounted a gate, and a latch swingingly depended from the frame in a position to engage with either of two spaced parts of the gate, the latch comprising a wire bent to provide two loops one above the other, one facing forwardly and the other rearwardly, and each adapted to lock with one of the two gate parts when moved to engaging position through converging paths.

3. The combination with a gate having a pivoted mounting which directs two spaced members through converging paths in response to opening and closing movements, of a movably mounted latch having dual engaging means one for locking with each of said members.

4. The combination with a gate having a pivoted mounting which directs two spaced members through converging paths in response to opening and closing movements, of a movably mounted latch having separate engaging means for locking with either of said members.

5. The combination with a gate having a pivoted mounting which directs two spaced members through converging paths in response to opening and closing movements, of a movably mounted latch having separate engaging means for locking with either of said members together with an inclined surface leading to each of the engaging means.

ERNEST R. CARR.